US012769608B2

(12) United States Patent
Nambirajan et al.

(10) Patent No.: US 12,769,608 B2
(45) Date of Patent: Oct. 20, 2026

(54) PREDICTING RESOURCE-RELATED FAILURES USING MULTI-DIMENSIONAL-BASED MACHINE LEARNING TECHNIQUES

(71) Applicant: Dell Products L.P., Round Rock, TX (US)

(72) Inventors: Manoj Nambirajan, Hyderabad (IN); Mohit Kumar Agarwal, Cyberjaya (MY); Bijan Kumar Mohanty, Austin, TX (US); Hung T. Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 273 days.

(21) Appl. No.: 18/634,183

(22) Filed: Apr. 12, 2024

(65) Prior Publication Data

US 2025/0321823 A1 Oct. 16, 2025

(51) Int. Cl.
*G06F 11/00* (2006.01)
*G06F 11/07* (2006.01)

(52) U.S. Cl.
CPC ................................ *G06F 11/0793* (2013.01)

(58) Field of Classification Search
CPC ............... G06F 11/0793; G06F 11/079; G06F 11/0769; G06F 11/0775
See application file for complete search history.

(56) References Cited

U.S. PATENT DOCUMENTS

| | | | | |
|---|---|---|---|---|
| 8,281,185 | B2 | 10/2012 | Nussbaum et al. | |
| 8,397,108 | B1 | 3/2013 | Vannatter et al. | |
| 8,924,266 | B2 | 12/2014 | Hoskuldsson | |
| 11,610,679 | B1 * | 3/2023 | Zhan ...................... | G06N 3/096 |

* cited by examiner

*Primary Examiner* — Katherine Lin
(74) *Attorney, Agent, or Firm* — Ryan, Mason & Lewis, LLP

(57) ABSTRACT

Methods, apparatus, and processor-readable storage media for predicting resource-related failures using multi-dimensional-based machine learning techniques are provided herein. An example computer-implemented method includes obtaining data pertaining to at least one resource-related activity involving at least one resource and one or more users; predicting one or more failures associated with the at least one resource-related activity by processing at least a portion of the obtained data using one or more machine learning techniques; predicting one or more reasons attributed to at least one of the one or more predicted failures by processing the at least a portion of the obtained data using the one or more machine learning techniques; and performing one or more automated actions based at least in part on at least a portion of the one or more predicted failures and at least a portion of the one or more predicted reasons.

20 Claims, 10 Drawing Sheets

FIG. 4

400

```
#Import necessary libraries
%matplotlib inline
import pandas as pd
import numpy as np
import matplotlib.pyplot as plt
import seaborn as sns
import tensorflow as tf
print(tf.__version__)
from sklearn import preprocessing

import warnings
from sklearn.model_selection import train_test_split
warnings.filterwarnings("ignore")

#reading the historical data file into pandas dataframe
opportunity_df = pd.read_csv("opportunity_outcome.csv") # Read the historical opportunity data
```

FIG. 5

500

```
#Customer account doesn't play any role in the target variable.
opportunity_df = resolution_df.drop("customer_account" , axis=1)
```

FIG. 6

600

```
# Encode the categorical values by using Label Encoding
from sklearn.preprocessing import LabelEncoder

opportunity_df['opportunity_type'] = LabelEncoder().fit_transform(opportunity_df['opportunity_type'])
opportunity_df['division'] = LabelEncoder().fit_transform(opportunity_df['division'])
opportunity_df['opportunity_owner'] = LabelEncoder().fit_transform(opportunity_df['opportunity_owner'])
opportunity_df['product'] = LabelEncoder().fit_transform(opportunity_df['product'])
opportunity_df['category'] = LabelEncoder().fit_transform(opportunity_df['category'])
opportunity_df['region'] = LabelEncoder().fit_transform(opportunity_df['region'])
opportunity_df['deal_closure'] = LabelEncoder().fit_transform(opportunity)df['deal_closure'])
opportunity_df['reason'] = LabelEncoder().fit_transform(opportunity_df['reason'])

opportunity_df.head(10)
```

FIG. 7

700

```
# Split Training and Testing Datasets
#First get the independent variables and dependent variable separated
features = [col for col in opportunity_df.columns if col != 'deal_closure' or col != 'reason' ]

x_train, x_train, y_train, y_test = train_test_split(opportunity_df[features], product_maturity_df[['deal_closure', 'reason']]
                                     test_size=.3, random_stated=42)
```

*FIG. 8*

800

```
# Normalize and Scale the data
from sklearn.preprocessing import StandardScaler

scaler = StandardScaler().fit(x_train)

# Scale the training dataset
x_trainScaled = scaler.transform(x_train)

# Scale the testing dataset
x_testScaled = scaler.transform(x_test)
```

FIG. 9

900

```
# Using Tensorflow Keras to create the Multi-Output Neural Network model for pne binary and one multi-class classification

from tensorflow.keras import Model
from tensorflow.keras import Input
from tensorflow.keras.layers import Dense

# Define the Input Layer for the 12 input features
input_layer = keras.Input(shape=12, name="input_layer")

dense_1 = keras.layers.Dense(12, name = 'dense_1')(input_layer)
dense_2 = keras.layers.Dense(12, name = 'dense_2)(dense_1)

#Build the opportunity outcome Branch Neural Network
# First hidden layer
dense_11 = keras.layers.Dense(32, name = 'dense_11', activation="relu", kernel_initializer='normal')(input_layer)

# second hidden layer
dense_12 = keras.layers.Dense(16, name = 'dense_12', activation"relu", kernel_initializer='normal')(dense_11)

# Add outcome_branch output layer with 1 neuron for 2 types of modes and sigmoid activation for binary classification
outcome_branch = keras.layers.Dense(1, activation = 'sigmoid', name = 'outcome_output')(dense_12)

#Build the Reason Branch Neural Network
# First hidden layer
dense_21 = keras.layers.Dense(32, name = 'dense_21', activation='relu', kernel_initializer='normal')(input_layer)

# second hidden layer
dense_22 = keras.layers.Dense(16, name = 'dense_22', activation="relu", kernel_initializer='normal')(dense_21)

# Add reason_branch output layer with 7 neurons for 7 types of outcome reasons with Softmax activation
reason_branch = keras.layers.Dense(7, activation = 'softmax', name = 'reason_output')(dense_22)
```

FIG. 10

1000

```
#Assemble the model

# Initialize the constructor
model = Model(inputs=input_layer,
              outputs = [outcome_branch, reason_branch],
              name="opportunity_net"))
```

FIG. 11

1100

```
# set the loss function, metrics and optimizer
model.compile(optimizer='adam',
        loss={'outcome_output': 'binary_crossentropy',
            'reason_output': 'categorical_crossentropy'},
        metrics = {'outcome_output': 'accuracy',
            'reason_output': 'accuracy'})

# Train the model with the training data
model = model.fit(x_trainScaled, {"outcome_output": y_train['value'], "deal_closure": y_train['reason']},
              validation_split=0.2, epochs=100, batch_size=500, verbose=1)
```

FIG. 12

1200

```
# Predict the class of opportunity outcome and reason of the outcome from the model
y_predict = model.predict(x_testScaled)
```

PREDICTING RESOURCE-RELATED FAILURES USING MULTI-DIMENSIONAL-BASED MACHINE LEARNING TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In many contexts, enterprises and/or other organizations face multiple factors which can drive outcomes for resource-related processes. However, conventional resource management techniques typically fail to determine which factors impact particular outcomes, particularly negative outcomes. Accordingly, such conventional techniques often lead to additional negative outcomes, resulting in losses and inefficiencies with respect to time and other resources.

SUMMARY

Illustrative embodiments of the disclosure provide techniques for predicting resource-related failures using multi-dimensional-based machine learning techniques.

An exemplary computer-implemented method includes obtaining data pertaining to at least one resource-related activity involving at least one resource and one or more users, and predicting one or more failures associated with the at least one resource-related activity by processing at least a portion of the obtained data using one or more machine learning techniques. The method also includes predicting one or more reasons attributed to at least one of the one or more predicted failures by processing the at least a portion of the obtained data using the one or more machine learning techniques. Further, the method additionally includes performing one or more automated actions based at least in part on at least a portion of the one or more predicted failures and at least a portion of the one or more predicted reasons.

Illustrative embodiments can provide significant advantages relative to conventional resource management techniques. For example, problems associated with losses and inefficiencies with respect to time and other resources are overcome in one or more embodiments through automatically predicting resource-related activity failures and reasons attributed to such failures by processing resource-related data using multi-output machine learning techniques.

These and other illustrative embodiments described herein include, without limitation, methods, apparatus, systems, and computer program products comprising processor-readable storage media.

BRIEF DESCRIPTION OF THE DRAWINGS

FIG. 4 shows example pseudocode for implementing data preprocessing techniques in an illustrative embodiment.

FIG. 5 shows example pseudocode for removing column data from a dataset in an illustrative embodiment.

FIG. 6 shows example pseudocode for encoding categorical values into numerical values in an illustrative embodiment.

FIG. 7 shows example pseudocode for dividing a dataset into training and testing subsets in an illustrative embodiment.

FIG. 8 shows example pseudocode for scaling training data and testing data in an illustrative embodiment.

FIG. 9 shows example pseudocode for building a neural network model in an illustrative embodiment.

FIG. 10 shows example pseudocode for assembling multiple branches of a neural network model in an illustrative embodiment.

FIG. 11 shows example pseudocode for compiling and training a neural network model in an illustrative embodiment.

FIG. 12 shows example pseudocode for predicting target values using a trained neural network model in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
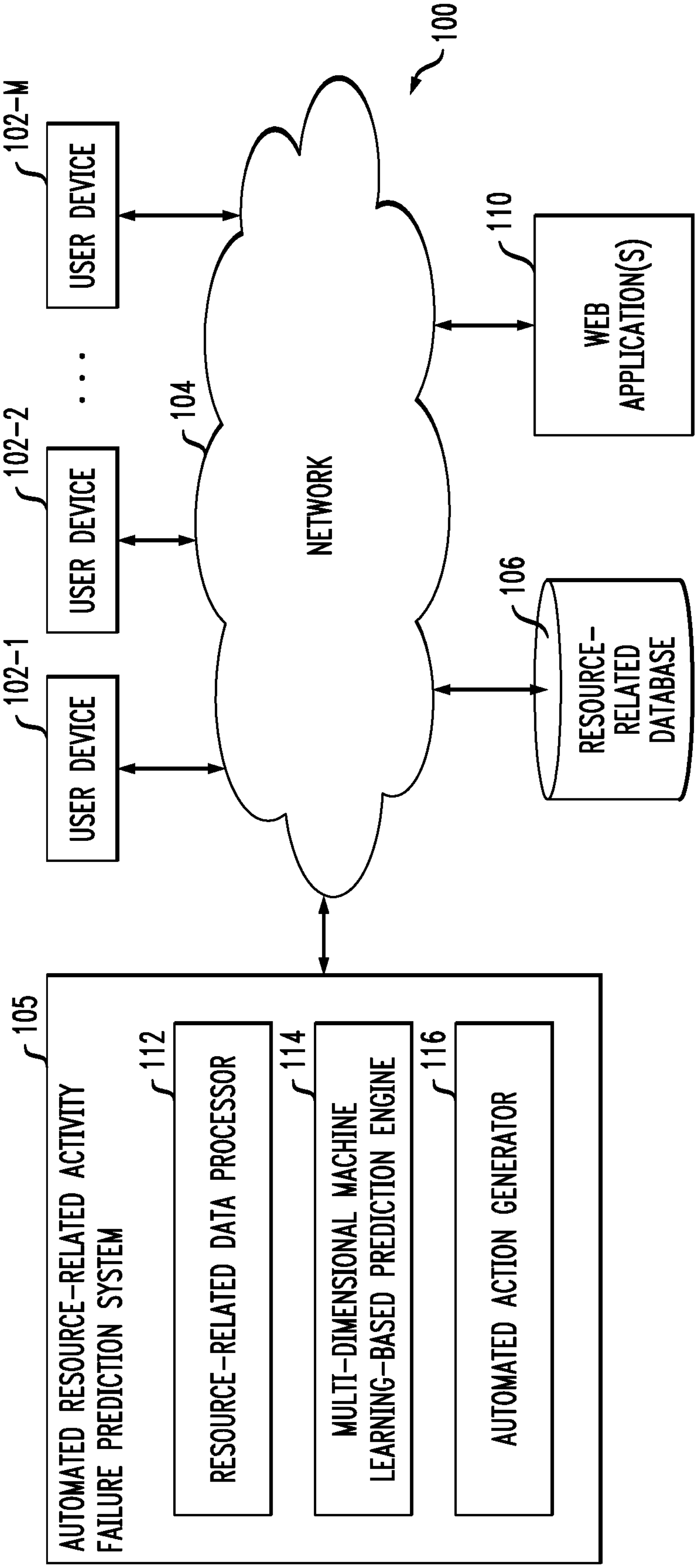
FIG. 1 shows an information processing system configured for predicting resource-related failures using multi-dimensional-based machine learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated resource-related activity failure prediction system 105 and one or more web applications 110 (e.g., one or more e-commerce applications, one or more software development applications, one or more logistics applications, one or more communications applications, etc.).

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the automated resource-related activity failure prediction system 105 can have an associated resource-related database 106 configured to store user-related data, enterprise segment-related data, resource-related data, resource-related activity data, region data, language data, temporal data associated with resources, etc.

The resource-related database 106 in the present embodiment is implemented using one or more storage systems associated with the automated resource-related activity failure prediction system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the automated resource-related activity failure prediction system 105 are one or more input-output devices, which illustratively comprise keyboards, displays or other types of input-output devices in any combination. Such input-output devices can be used, for example, to support one or more user interfaces to the automated resource-related activity failure prediction system 105, as well as to support communication between the automated resource-related activity failure prediction system 105 and other related systems and devices not explicitly shown.

Additionally, the automated resource-related activity failure prediction system 105 in the FIG. 1 embodiment is assumed to be implemented using at least one processing device. Each such processing device generally comprises at least one processor and an associated memory, and implements one or more functional modules for controlling certain features of the automated resource-related activity failure prediction system 105.

More particularly, the automated resource-related activity failure prediction system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the automated resource-related activity failure prediction system 105 to communicate over the network 104 with the user devices 102, and illustratively comprises one or more conventional transceivers.

The automated resource-related activity failure prediction system 105 further comprises resource-related data processor 112, multi-dimensional machine learning-based prediction engine 114, and automated action generator 116.

It is to be appreciated that this particular arrangement of elements 112, 114 and 116 illustrated in the automated resource-related activity failure prediction system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for predicting resource-related failures using multi-dimensional-based machine learning techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of automated resource-related activity failure prediction system 105, resource-related database 106, and web application(s) 110 can be on and/or part of the same processing platform.

An exemplary process utilizing elements 112, 114 and 116 of an example automated resource-related activity failure prediction system 105 in computer network 100 will be described in more detail with reference to the flow diagram of FIG. 13.

Accordingly, at least one embodiment includes predicting resource-related failures using multi-dimensional-based machine learning techniques. More particularly, one or more embodiments include leveraging one or more machine learning models trained on multi-dimensional historical data pertaining to resource-related failures including information related to one or more reason(s) for the corresponding resource-related failures. In such an embodiment the information related to one or more reason(s) for the corresponding resource-related failures is present in the training data. For example, for each set of opportunity data, irrespective of the outcome of the corresponding opportunity, there will be a "reason" attribute which will be populated by one or more users (e.g., a sales representative) and/or one or more automated systems, and this attribute can be used as one of the target labels for the training data.

Once trained, such a machine learning model (e.g., a classification-based machine learning model) can be implemented to predict one or more potential reasons for a given resource-related activity (e.g., at least one transactional opportunity) outcome, in connection with predicting the outcome itself. Such predictions can facilitate and/or initiate automated course correction activities to potentially avoid the resource-related failure. Accordingly, such predictions can facilitate improvements in navigating the given resource-related activity (e.g., dealing with a customer) in a more intelligent manner. For example, if a prediction indicates that a given resource-related activity (e.g., a commercial opportunity) will be lost due to a particular reason (e.g., pricing, return on investment, one or more financial terms, delivery timetable, lead time, etc.), at least one user (e.g., a sales representative) and/or at least one related automated system can direct efforts to actions which can influence that particular reason (e.g., automatically modifying pricing and/or one or more financial terms, automatically negotiating and/or modifying delivery time information, etc.) to render the resource-related activity successful.

Utilizing multi-dimensional data including, for example, user-related data, enterprise segment-related data, resource-related (e.g., product-related) data, region data, language data, time period data (e.g., data related to one or more seasonality factors), etc., one or more embodiments can include implementing at least one machine learning model to predict the failure probability of at least one given resource-related activity. In addition, such an embodiment can include implementing the at least one machine learning model to estimate temporal information associated with the at least one given resource-related activity (e.g., the duration of a resource-related activity such as the amount of time remaining to close a transactional opportunity).

As detailed herein, at least one embodiment includes generating and/or implementing a prediction engine trained to predict at least one resource-related activity outcome (e.g., a transaction closing or not) and one or more reasons that the at least one resource-related activity may fail. Such a prediction engine can process data from a set of input features including, for example, resource-related activity information such as, e.g., account and/or activity name, type of activity, owner and/or enterprise group associated with the activity, resources and/or products included in the activity as well as their quantities and/or value(s), the total cost of the activity, etc. At least one target label of the prediction engine can include one or more reasons that the resource-related activity will be successful or will fail. For example, predicted reasons for a successful resource-related activity such as, e.g., a transactional opportunity conversion, can include "relationship," "pricing and/or return on investment," etc. Alternatively, example predicted reasons for a failed resource-related activity such as, e.g., a transactional opportunity conversion, can include "delivery, lead time and/or supply," "product, features and/or solution," "services and/or support," "pricing, return on investment and/or financial terms," "relationship," "duplicate," etc. By having such predicted reasons as a target label for the prediction engine, at least one machine learning model of the prediction engine can predict not only the outcome (e.g., whether a transactional opportunity will close or not) but also the reason(s) for the outcome.

In one or more embodiments, once the data is obtained, data engineering and/or exploratory data analysis is carried out to identify one or more important features and/or columns that can influence the target variables (that is, the outcome of the corresponding resource-related activity and the reason(s) for the outcome). Such actions can also help in identifying one or more unnecessary columns and one or more data features that are highly correlated, which can result in removing one or more columns and/or features to reduce data dimensionality and model complexity, as well as to improve the performance and accuracy of the model.

Figure 2:
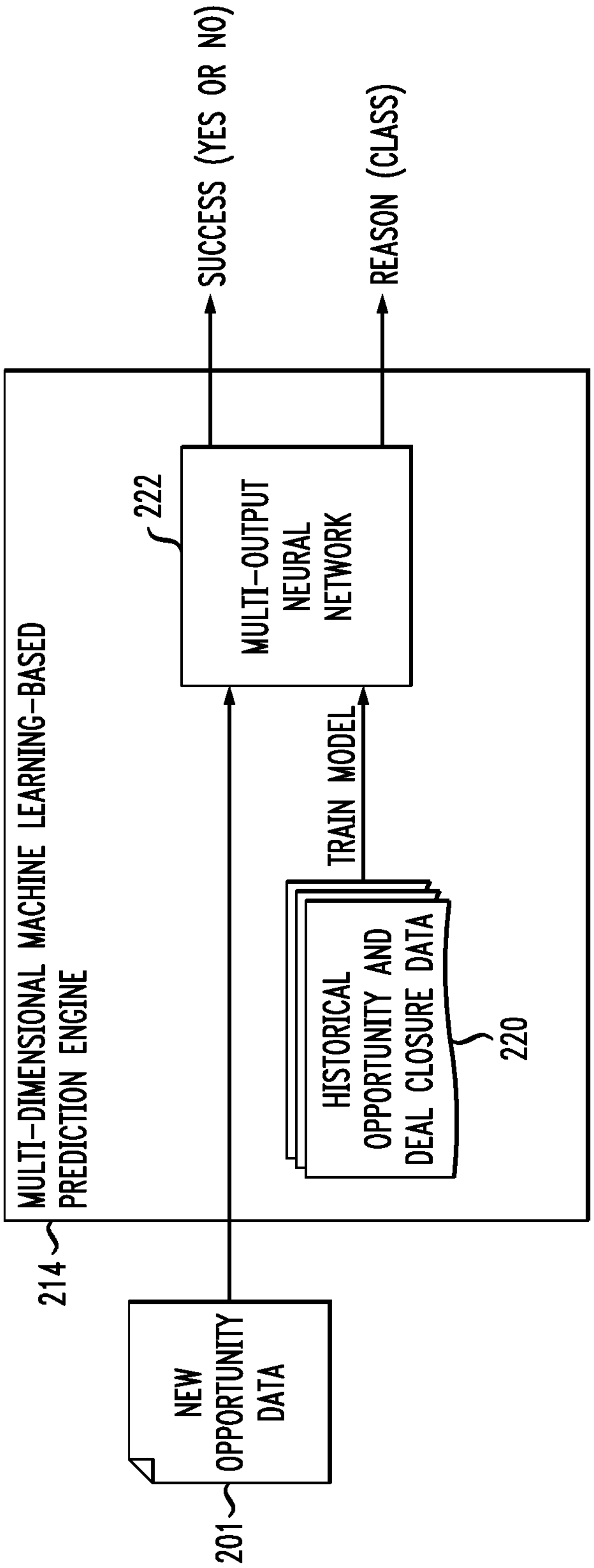
FIG. 2 shows an example system architecture in an illustrative embodiment.

FIG. 2 shows an example system architecture in an illustrative embodiment. By way of illustration, FIG. 2 depicts architecture of an example multi-dimensional machine learning-based prediction engine 214, which includes at least one multi-output neural network 222, which is trained using historical opportunity and deal closure data 220. As also depicted in FIG. 2, new opportunity data 201 can be provided to and/or proceed by the multi-output neural network 222, which generates a success prediction (i.e., yes, the opportunity will result in a successful transaction, or no, the opportunity will not result in a successful transaction) and a prediction as to the one or more reasons (e.g., from a class of multiple predefined reasons) for the success prediction.

Due to the complexity and dimensionality of the data, as well as the nature of performing multi-target predictions, at least one embodiment includes leveraging at least one deep neural network model and building and/or training a custom neural network model that has two parallel branches. In such an embodiment, both branches act as a classifier, one for predicting the resource-related activity outcome and the other for predicting one or more reasons for the resource-related activity outcome.

Figure 3:
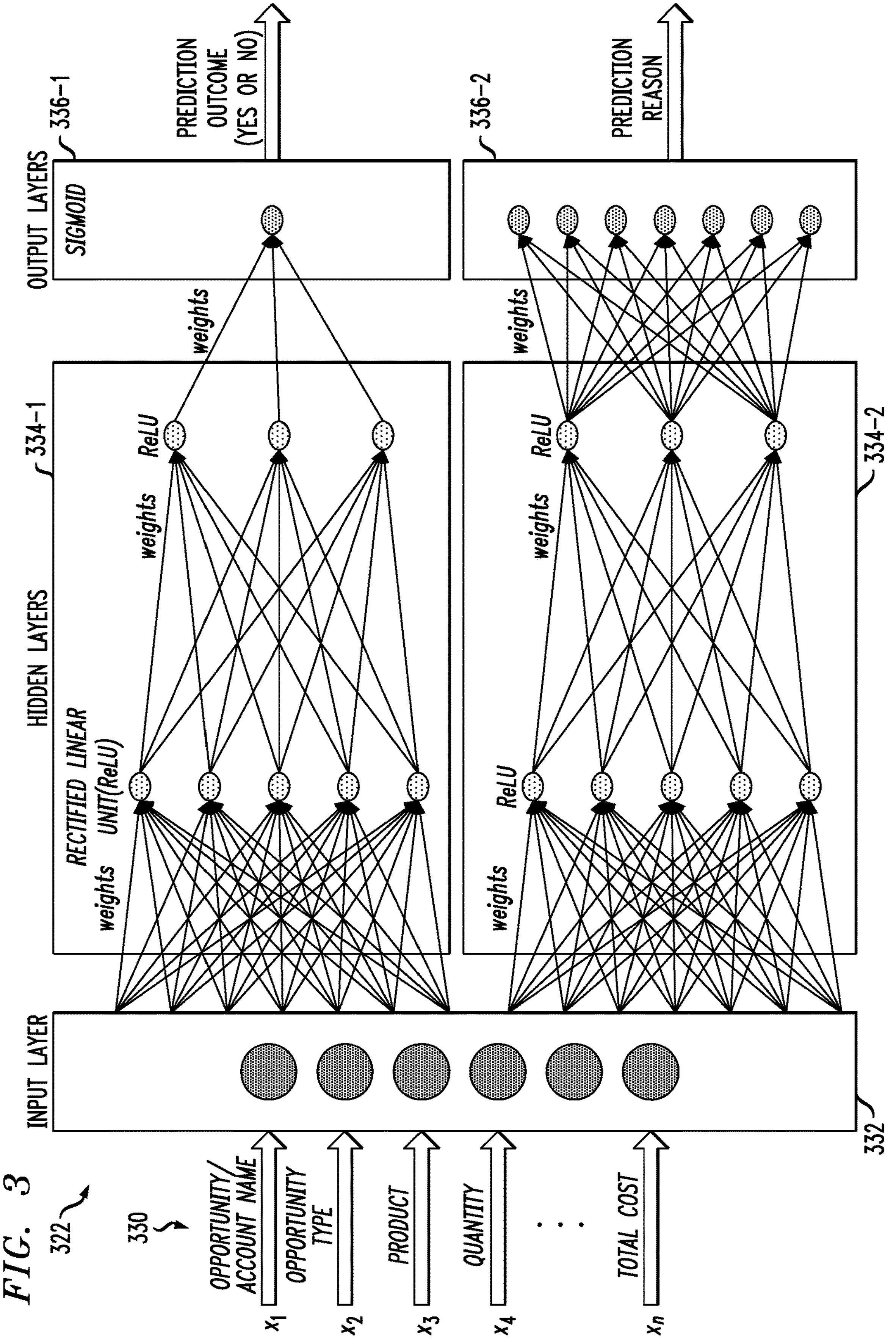
FIG. 3 shows an example neural network architecture in an illustrative embodiment.

FIG. 3 shows an example neural network architecture in an illustrative embodiment. By way of illustration, FIG. 3 depicts a multi-output neural network 322, a type of deep neural network model that has two parallel branches of network for two types of outputs. Accordingly, such an embodiment includes taking the same set of input variables 330 (e.g., opportunity and/or account name, opportunity type, product, quantity, total cost, etc.) as a single input layer 332, and building and/or training a dense, multi-layer neural network model which acts as two sophisticated classifiers for multi-output predictions. The example multi-output neural network 322 depicted in FIG. 3 includes one input layer 332, hidden layers 334-1 and 334-2, and output layers 336-1 and 336-2.

As a multi-output neural network model, the multi-output neural network 322 creates two separate branches of the network (e.g., two hidden layers, 334-1 and 334-2, as well as two output layers, 336-1 and 336-2) that connect to the same input layer 332. In at least one embodiment, such an input layer 332 can include a number of neurons that matches the number of input and/or independent variables. Also, in such an embodiment, the two hidden layers, 334-1 and 334-2, can include neurons on each layer in amounts/numbers that depend upon the number of neurons in the input layer. Further, in such an embodiment, the two output layers (e.g., one output layer for each branch of the model), 336-1 and 336-2, can contain different numbers of neurons due to the type of output generated and/or used.

In at least one embodiment, wherein both branches of the model act as classifiers, the number of classes of each branch can vary. For example, the resource-related activity outcome classifier can have two classes (that is, yes (success) and no (failure)), while the outcome reason(s) classifier can contain multiple classes (e.g., "relationship," "pricing," "delivery, lead time, and/or supply," etc. Also, the resource-related activity outcome classifier branch that predicts the success or failure of the resource-related activity can include one neuron at the output layer with an activation function (e.g., a sigmoid activation function), while the outcome reason(s) classifier branch that predicts one or more reasons for the resource-related activity outcome can include multiple neurons (e.g., one neuron for each class of reason) for the output layer with an activation function (e.g., a softmax activation function). Additionally, in one or more embodiments, the neurons in the hidden layers can use at least one activation function (e.g., a rectified linear unit (ReLU) activation function) for both branches.

The implementation of at least portions of one or more embodiments can be achieved, for example, as depicted in FIG. 4 through FIG. 12, by using Keras with a Tensorflow backend, Python language, as well as Pandas, Numpy and ScikitLearn libraries.

FIG. 4 shows example pseudocode for implementing data preprocessing techniques in an illustrative embodiment. In this embodiment, example pseudocode 400 is executed by or under the control of at least one processing system and/or device. For example, the example pseudocode 400 may be viewed as comprising a portion of a software implementation of at least part of automated resource-related activity failure prediction system 105 of the FIG. 1 embodiment.

The example pseudocode 400 illustrates importing necessary libraries, reading a dataset of historical opportunity and deal outcome, and generating a Pandas data frame. The data frame contains columns including independent variables, as well as the dependent and/or target variable columns (e.g., deal success prediction and the closure duration estimation). Additionally, in connection with example pseudocode 400, preprocessing of such data includes handling any null or missing values in the columns. In one or more embodiments, null or missing values in numerical columns can be replaced by the median value of that column. After handling null or missing values in the columns, such an embodiment can include performing initial data analysis by creating one or more univariate and/or bivariate plots of the columns, whereby the importance and/or influence of each column can be understood. Columns that have limited importance and/or influence (e.g., no importance and/or influence) on the actual prediction (i.e., the dependent and/or target variable) can be removed.

It is to be appreciated that this particular example pseudocode shows just one example implementation of data preprocessing techniques, and alternative implementations can be used in other embodiments.

FIG. 5 shows example pseudocode for removing column data from a dataset in an illustrative embodiment. In this embodiment, example pseudocode 500 is executed by or under the control of at least one processing system and/or device. For example, the example pseudocode 500 may be viewed as comprising a portion of a software implementation of at least part of automated resource-related activity failure prediction system 105 of the FIG. 1 embodiment.

The example pseudocode 500 illustrates removing column values (e.g., customer and account names), in connection with preprocessing such as detailed above in connection with FIG. 4, which have limited importance and/or influence on the output predictions. Particularly, such a column can be dropped from a given dataset, as illustrated in example pseudocode 500.

It is to be appreciated that this particular example pseudocode shows just one example implementation of removing column data from a dataset, and alternative implementations can be used in other embodiments.

FIG. 6 shows example pseudocode for encoding categorical values into numerical values in an illustrative embodiment. In this embodiment, example pseudocode 600 is executed by or under the control of at least one processing system and/or device. For example, the example pseudocode 600 may be viewed as comprising a portion of a software implementation of at least part of automated resource-related activity failure prediction system 105 of the FIG. 1 embodiment.

The example pseudocode 600 illustrates encoding categorical values in column data into numerical values, as machine learning models are configured to process numerical values. For example, as depicted in example pseudocode 600, categorical values such as opportunity type, division, product category, etc., must be encoded, and such encoding can be carried out using a LabelEncoder function from a ScikitLearn library.

It is to be appreciated that this particular example pseudocode shows just one example implementation of encoding categorical values into numerical values, and alternative implementations can be used in other embodiments.

FIG. 7 shows example pseudocode for dividing a dataset into training and testing subsets in an illustrative embodiment. In this embodiment, example pseudocode 700 is executed by or under the control of at least one processing system and/or device. For example, the example pseudocode 700 may be viewed as comprising a portion of a software implementation of at least part of automated resource-related activity failure prediction system 105 of the FIG. 1 embodiment.

The example pseudocode 700 illustrates dividing or splitting a dataset into training and testing subsets using a train_test_split function from a ScikitLearn library. By way of example, such splitting can be in the form of 70% training data and 30% testing data. Because one or more embodiments encompass use cases of multi-target prediction, example pseudocode 700 depicts separating both of the target variables from the dataset.

It is to be appreciated that this particular example pseudocode shows just one example implementation of dividing a dataset into training and testing subsets, and alternative implementations can be used in other embodiments.

FIG. 8 shows example pseudocode for scaling training data and testing data in an illustrative embodiment. In this embodiment, example pseudocode 800 is executed by or under the control of at least one processing system and/or device. For example, the example pseudocode 800 may be viewed as comprising a portion of a software implementation of at least part of automated resource-related activity failure prediction system 105 of the FIG. 1 embodiment.

The example pseudocode 800 illustrates normalizing and scaling the training data and testing data using a StandardScaler function from a ScikitLearn library.

It is to be appreciated that this particular example pseudocode shows just one example implementation of scaling training data and testing data, and alternative implementations can be used in other embodiments.

FIG. 9 shows example pseudocode for building a neural network model in an illustrative embodiment. In this embodiment, example pseudocode 900 is executed by or under the control of at least one processing system and/or device. For example, the example pseudocode 900 may be viewed as comprising a portion of a software implementation of at least part of automated resource-related activity failure prediction system 105 of the FIG. 1 embodiment.

The example pseudocode 900 illustrates creating a multilayer, multi-output capable dense neural network using a Keras library. Specifically, example pseudocode 900 depicts steps for defining the input layer for twelve input features, building an opportunity outcome branch of the neural network, including a first hidden layer and a second hidden layer, and adding an outcome branch output layer with one neuron for two types of modes and a sigmoid activation function for binary classification. Also, example pseudocode 900 depicts steps for building a reason branch of the neural network, including a first hidden layer and a second hidden layer, and adding a reason branch output layer with seven neurons for seven types of outcome reasons, as well as a softmax activation function. Accordingly, example pseudocode 900 illustrates a neural network built using a Keras functional model, with separate branches created and added to the functional model. Specifically, in this example embodiment, two separate dense layers are added, with each branch of the neural network capable of predicting different targets (e.g., opportunity outcome and reason of the outcome).

It is to be appreciated that this particular example pseudocode shows just one example implementation of building a neural network model, and alternative implementations can be used in other embodiments.

FIG. 10 shows example pseudocode for assembling multiple branches of a neural network model in an illustrative embodiment. In this embodiment, example pseudocode 1000 is executed by or under the control of at least one processing system and/or device. For example, the example pseudocode 1000 may be viewed as comprising a portion of a software implementation of at least part of automated resource-related activity failure prediction system 105 of the FIG. 1 embodiment.

The example pseudocode 1000 illustrates assembling both branches of the neural network, as detailed in connection with FIG. 9, into a main model using a Keras functional model.

It is to be appreciated that this particular example pseudocode shows just one example implementation of assembling multiple branches of a neural network model, and alternative implementations can be used in other embodiments.

FIG. 11 shows example pseudocode for compiling and training a neural network model in an illustrative embodiment. In this embodiment, example pseudocode 1100 is executed by or under the control of at least one processing system and/or device. For example, the example pseudocode 1100 may be viewed as comprising a portion of a software implementation of at least part of automated resource-related activity failure prediction system 105 of the FIG. 1 embodiment.

The example pseudocode 1100 illustrates using, as part of the neural network mode, the adaptive moment estimation (Adam) function as an optimizer and binary_crossentropy as a loss function for the outcome branch, which is a binary b classification, and using categorical_crossentropy as a loss function for the reason branch, which is a multi-class classification (i.e., one out of seven reasons). Also, the neural network model is trained using the training independent variables data (X_train), and the target variables data are passed for each path.

It is to be appreciated that this particular example pseudocode shows just one example implementation of compiling and training a neural network model, and alternative implementations can be used in other embodiments.

FIG. 12 shows example pseudocode for predicting target values using a trained neural network model in an illustrative embodiment. In this embodiment, example pseudocode 1200 is executed by or under the control of at least one processing system and/or device. For example, the example pseudocode 1200 may be viewed as comprising a portion of a software implementation of at least part of automated resource-related activity failure prediction system 105 of the FIG. 1 embodiment.

The example pseudocode 1200 illustrates the neural network model being asked to predict both target values by passing independent variable values to the predict ( ) of the neural network model.

It is to be appreciated that this particular example pseudocode shows just one example implementation of predicting target values using a trained neural network model, and alternative implementations can be used in other embodiments.

It is to be appreciated that some embodiments described herein utilize one or more artificial intelligence models. It is to be appreciated that the term "model," as used herein, is intended to be broadly construed and may comprise, for example, a set of executable instructions for generating computer-implemented recommendations and/or predictions. For example, one or more of the models described herein may be trained to generate recommendations and/or predictions based on resource-related data, resource-related activity data, and user-related data, and such recommendations and/or predictions can be used to initiate one or more automated actions (e.g., automatically initiated one or more course correction actions, automatically training at least a portion of the model based on output feedback, etc.).

Figure 13:
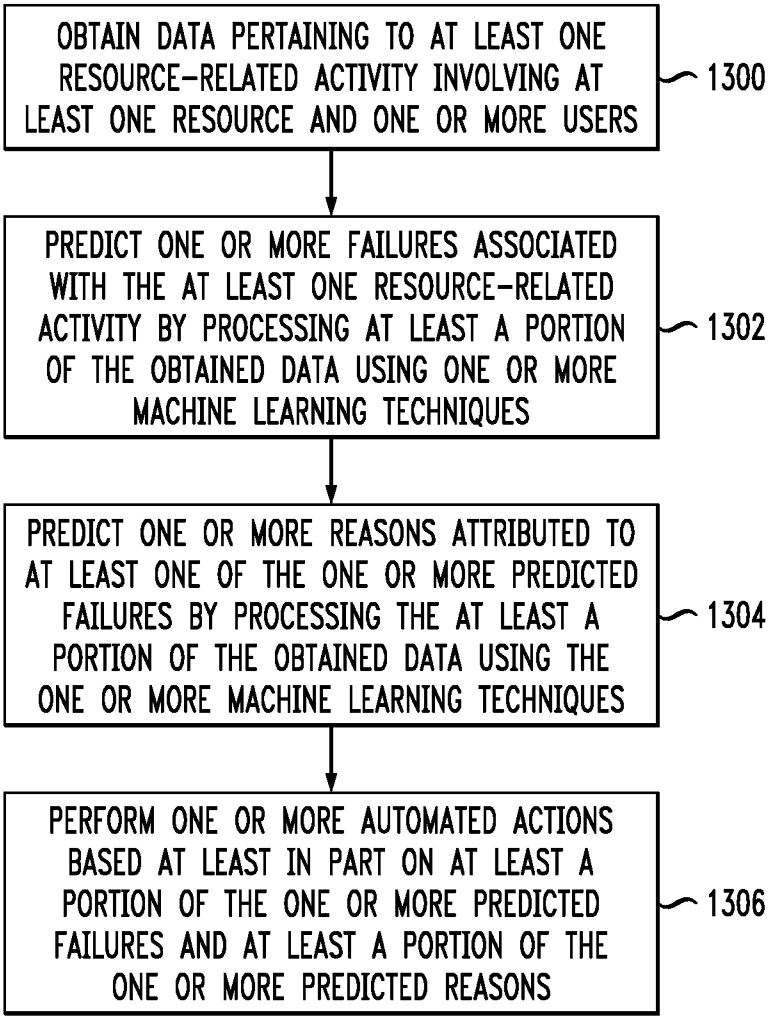
FIG. 13 is a flow diagram of a process for predicting resource-related failures using multi-dimensional-based machine learning techniques in an illustrative embodiment.

FIG. 13 is a flow diagram of a process for predicting resource-related failures using multi-dimensional-based machine learning techniques in an illustrative embodiment. It is to be understood that this particular process is only an example, and additional or alternative processes can be carried out in other embodiments.

In this embodiment, the process includes steps 1300 through 1306. These steps are assumed to be performed by the automated resource-related activity failure prediction system 105 utilizing elements 112, 114 and 116.

Step 1300 includes obtaining data pertaining to at least one resource-related activity involving at least one resource and one or more users. In at least one embodiment, obtaining data pertaining to at least one resource-related activity includes obtaining one or more of user-related data attributed to the one or more users, resource-related data attributed to the at least one resource, data related to one or more actions already performed as part of the at least one resource-related activity, and temporal data associated with the at least one resource.

Step 1302 includes predicting one or more failures associated with the at least one resource-related activity by processing at least a portion of the obtained data using one or more machine learning techniques. In one or more embodiments, predicting one or more failures associated with the at least one resource-related activity includes processing at least a portion of the obtained data using at least one multi-output neural network model.

Step 1304 includes predicting one or more reasons attributed to at least one of the one or more predicted failures by processing the at least a portion of the obtained data using the one or more machine learning techniques. In at least one embodiment, predicting one or more reasons attributed to at least one of the one or more predicted failures includes processing the at least a portion of the obtained data using the at least one multi-output neural network model.

In one or more embodiments, using the at least one multi-output neural network model includes configuring the at least one multi-output neural network model to include an input layer, two or more hidden layers, and two or more output layers. In such an embodiment, configuring the at least one multi-output neural network model can include configuring the input layer to include a number of neurons that matches a number of input data variables, configuring the two or more hidden layers to include a number of neurons that is based at least in part on the number of neurons in the input layer, and configuring the two or more output layers to include a variable number of neurons across the two or more output layers based at least in part on a type of output associated with each of the two or more output layers. Additionally, in such an embodiment, a first one of the two or more output layers can be configured to generate a prediction of the one or more failures associated with the at least one resource-related activity, and a second one of the two or more output layers can be configured to generate a prediction of the one or more reasons attributed to the at least one of the one or more predicted failures. Further, in such an embodiment, the first one of the two or more output layers includes one neuron associated with a binary determination with respect to failure, and the second one of the two or more output layers includes multiple neurons associated with multiple predetermined classes of reasons associated with resource-related activity failures related to at least one of the at least one resource and the one or more users.

Step 1306 includes performing one or more automated actions based at least in part on at least a portion of the one or more predicted failures and at least a portion of the one or more predicted reasons. In one or more embodiments, the at least one resource-related activity is ongoing, and performing one or more automated actions includes automatically initiating one or more course correction activities directed at avoid the at least a portion of the one or more predicted failures and related to the at least a portion of the one or more predicted reasons. By way merely of example, if a prediction indicates that a given resource-related activity (e.g., a commercial opportunity) will be lost due to a particular reason (e.g., pricing, return on investment, one or more financial terms, delivery timetable, lead time, etc.), such course correction activities can include automatically directing (e.g., via one or more related and/or external systems) actions which can influence that particular reason (e.g., automatically modifying pricing and/or one or more financial terms, automatically negotiating and/or modifying delivery time information, etc.) to render the resource-related activity successful. Additionally or alternatively, performing one or more automated actions can include automatically training at least a portion of the one or more machine learning techniques using feedback related to one or more of the at least a portion of the one or more predicted failures and the at least a portion of the one or more predicted reasons.

Accordingly, the particular processing operations and other functionality described in conjunction with the flow diagram of FIG. 13 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically predict resource-related activity failures and reasons attributed to such failures by processing resource-related data using multi-output machine learning techniques. These and other embodiments can effectively overcome problems associated with losses and inefficiencies with respect to time and other resources.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 14 and 15. Although described in the context of system 100, these platforms may also be used to implement at least portions of other information processing systems in other embodiments.

Figure 14:
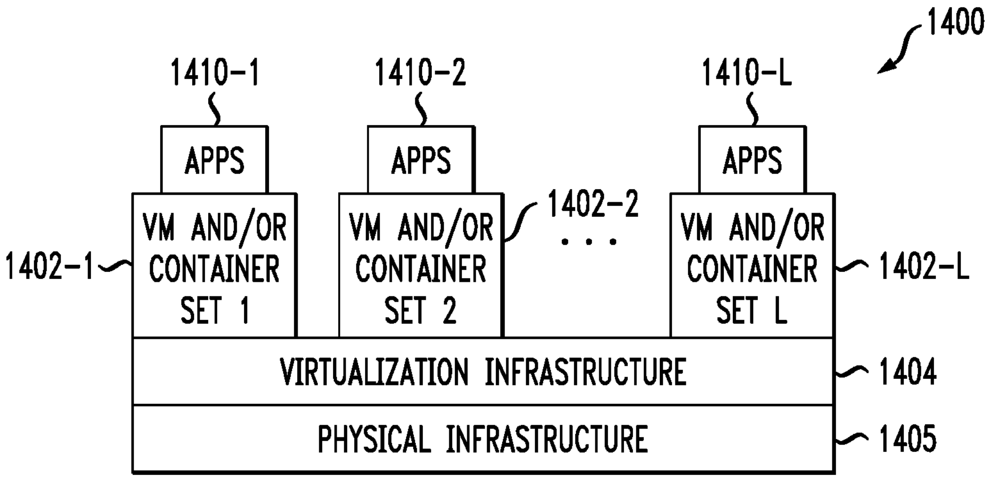
FIGS. 14 and 15 show examples of processing platforms that may be utilized to implement at least a portion of an information processing system in illustrative embodiments.
Figure 15:
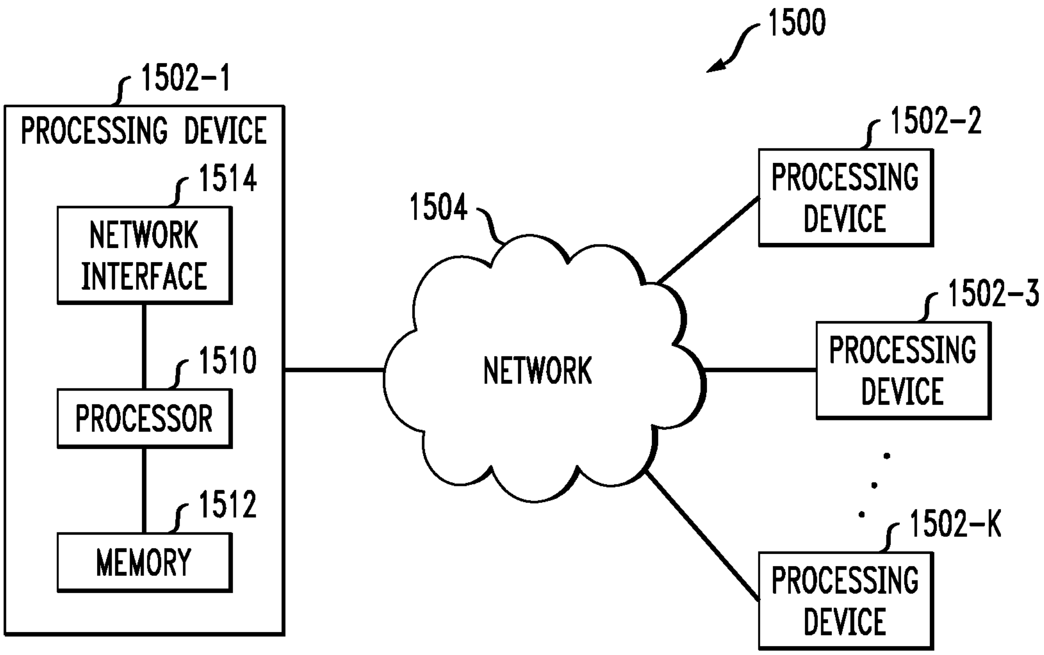

FIG. 14 shows an example processing platform comprising cloud infrastructure 1400. The cloud infrastructure 1400 comprises a combination of physical and virtual processing resources that are utilized to implement at least a portion of the information processing system 100. The cloud infrastructure 1400 comprises multiple virtual machines (VMs) and/or container sets 1402-1, 1402-2, . . . 1402-L implemented using virtualization infrastructure 1404. The virtualization infrastructure 1404 runs on physical infrastructure 1405, and illustratively comprises one or more hypervisors and/or operating system level virtualization infrastructure. The operating system level virtualization infrastructure illustratively comprises kernel control groups of a Linux operating system or other type of operating system.

The cloud infrastructure 1400 further comprises sets of applications 1410-1, 1410-2, . . . 1410-L running on respective ones of the VMs/container sets 1402-1, 1402-2, . . . 1402-L under the control of the virtualization infrastructure 1404. The VMs/container sets 1402 comprise respective VMs, respective sets of one or more containers, or respective sets of one or more containers running in VMs. In some implementations of the FIG. 14 embodiment, the VMs/container sets 1402 comprise respective VMs implemented using virtualization infrastructure 1404 that comprises at least one hypervisor.

A hypervisor platform may be used to implement a hypervisor within the virtualization infrastructure 1404, wherein the hypervisor platform has an associated virtual infrastructure management system. The underlying physical machines comprise one or more information processing platforms that include one or more storage systems.

In other implementations of the FIG. 14 embodiment, the VMs/container sets 1402 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1400 shown in FIG. 14 may represent at least a portion of one processing platform. Another example of such a processing platform is processing platform 1500 shown in FIG. 15.

The processing platform 1500 in this embodiment comprises a portion of system 100 and includes a plurality of processing devices, denoted 1502-1, 1502-2, 1502-3, . . . 1502-K, which communicate with one another over a network 1504.

The network 1504 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1502-1 in the processing platform 1500 comprises a processor 1510 coupled to a memory 1512.

The processor 1510 comprises a microprocessor, a CPU, a GPU, a TPU, a microcontroller, an ASIC, a FPGA or other type of processing circuitry, as well as portions or combinations of such circuitry elements.

The memory 1512 comprises random access memory (RAM), read-only memory (ROM) or other types of memory, in any combination. The memory 1512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

obtaining data pertaining to at least one resource-related activity involving at least one resource and one or more users, wherein obtaining data pertaining to at least one resource-related activity comprises obtaining one or more of user-related data attributed to the one or more users, resource-related data attributed to the at least one resource, data related to one or more actions already performed as part of the at least one resource-related activity, and temporal data associated with the at least one resource;

predicting one or more failures associated with the at least one resource-related activity by processing at least a portion of the obtained data using one or more machine learning techniques;

predicting one or more reasons attributed to at least one of the one or more predicted failures by processing the at least a portion of the obtained data using the one or more machine learning techniques; and performing one or more automated actions based at least in part on at least a portion of the one or more predicted failures and at least a portion of the one or more predicted reasons;

wherein the method is performed by at least one processing device comprising a processor coupled to a memory.

2. The computer-implemented method of claim 1, wherein predicting one or more failures associated with the at least one resource-related activity comprises processing at least a portion of the obtained data using at least one multi-output neural network model.

3. The computer-implemented method of claim 2, wherein predicting one or more reasons attributed to at least one of the one or more predicted failures comprises processing the at least a portion of the obtained data using the at least one multi-output neural network model.

4. The computer-implemented method of claim 2, wherein using the at least one multi-output neural network model comprises configuring the at least one multi-output neural network model to include an input layer, two or more hidden layers, and two or more output layers.

5. The computer-implemented method of claim 4, wherein configuring the at least one multi-output neural network model comprises configuring the input layer to include a number of neurons that matches a number of input data variables, configuring the two or more hidden layers to include a number of neurons that is based at least in part on the number of neurons in the input layer, and configuring the two or more output layers to include a variable number of neurons across the two or more output layers based at least in part on a type of output associated with each of the two or more output layers.

6. The computer-implemented method of claim 5, wherein a first one of the two or more output layers is configured to generate a prediction of the one or more failures associated with the at least one resource-related activity, wherein a second one of the two or more output layers is configured to generate a prediction of the one or more reasons attributed to the at least one of the one or more predicted failures, and wherein the first one of the two or more output layers includes one neuron associated with a binary determination with respect to failure, and the second one of the two or more output layers includes multiple neurons associated with multiple predetermined classes of reasons associated with resource-related activity failures related to at least one of the at least one resource and the one or more users.

7. The computer-implemented method of claim 1, wherein the at least one resource-related activity is ongoing, and wherein performing one or more automated actions comprises automatically initiating one or more course correction activities directed at avoid the at least a portion of the one or more predicted failures and related to the at least a portion of the one or more predicted reasons.

8. The computer-implemented method of claim 1, wherein performing one or more automated actions comprises automatically training at least a portion of the one or more machine learning techniques using feedback related to one or more of the at least a portion of the one or more predicted failures and the at least a portion of the one or more predicted reasons.

9. A non-transitory processor-readable storage medium having stored therein program code of one or more software programs, wherein the program code when executed by at least one processing device causes the at least one processing device:

to obtain data pertaining to at least one resource-related activity involving at least one resource and one or more users, wherein obtaining data pertaining to at least one resource-related activity comprises obtaining one or more of user-related data attributed to the one or more users, resource-related data attributed to the at least one resource, data related to one or more actions already performed as part of the at least one resource-related activity, and temporal data associated with the at least one resource;

to predict one or more failures associated with the at least one resource-related activity by processing at least a portion of the obtained data using one or more machine learning techniques;

to predict one or more reasons attributed to at least one of the one or more predicted failures by processing the at least a portion of the obtained data using the one or more machine learning techniques; and to perform one or more automated actions based at least in part on at least a portion of the one or more predicted failures and at least a portion of the one or more predicted reasons.

10. The non-transitory processor-readable storage medium of claim 9, wherein predicting one or more failures associated with the at least one resource-related activity comprises processing at least a portion of the obtained data using at least one multi-output neural network model.

11. The non-transitory processor-readable storage medium of claim 10, wherein predicting one or more reasons attributed to at least one of the one or more predicted failures comprises processing the at least a portion of the obtained data using the at least one multi-output neural network model.

12. The non-transitory processor-readable storage medium of claim 10, wherein using the at least one multi-output neural network model comprises configuring the at least one multi-output neural network model to include an input layer, two or more hidden layers, and two or more output layers.

13. The non-transitory processor-readable storage medium of claim 12, wherein configuring the at least one multi-output neural network model comprises configuring the input layer to include a number of neurons that matches a number of input data variables, configuring the two or more hidden layers to include a number of neurons that is based at least in part on the number of neurons in the input layer, and configuring the two or more output layers to include a variable number of neurons across the two or more output layers based at least in part on a type of output associated with each of the two or more output layers.

14. The non-transitory processor-readable storage medium of claim 13, wherein a first one of the two or more output layers is configured to generate a prediction of the one or more failures associated with the at least one resource-related activity, wherein a second one of the two or more output layers is configured to generate a prediction of the one or more reasons attributed to the at least one of the one or more predicted failures, and wherein the first one of the two or more output layers includes one neuron associated with a binary determination with respect to failure, and the second one of the two or more output layers includes multiple neurons associated with multiple predetermined classes of reasons associated with resource-related activity failures related to at least one of the at least one resource and the one or more users.

15. An apparatus comprising:

at least one processing device comprising a processor coupled to a memory;

the at least one processing device being configured:

to obtain data pertaining to at least one resource-related activity involving at least one resource and one or more users, wherein obtaining data pertaining to at least one resource-related activity comprises obtaining one or more of user-related data attributed to the one or more users, resource-related data attributed to the at least one resource, data related to one or more actions already performed as part of the at least one resource-related activity, and temporal data associated with the at least one resource;

to predict one or more failures associated with the at least one resource-related activity by processing at least a portion of the obtained data using one or more machine learning techniques;

to predict one or more reasons attributed to at least one of the one or more predicted failures by processing the at least a portion of the obtained data using the one or more machine learning techniques; and to perform one or more automated actions based at least in part on at least a portion of the one or more predicted failures and at least a portion of the one or more predicted reasons.

16. The apparatus of claim 15, wherein predicting one or more failures associated with the at least one resource-related activity comprises processing at least a portion of the obtained data using at least one multi-output neural network model.

17. The apparatus of claim 16, wherein predicting one or more reasons attributed to at least one of the one or more predicted failures comprises processing the at least a portion of the obtained data using the at least one multi-output neural network model.

18. The apparatus of claim 16, wherein using the at least one multi-output neural network model comprises configuring the at least one multi-output neural network model to include an input layer, two or more hidden layers, and two or more output layers.

19. The apparatus of claim 18, wherein configuring the at least one multi-output neural network model comprises configuring the input layer to include a number of neurons that matches a number of input data variables, configuring the two or more hidden layers to include a number of neurons that is based at least in part on the number of neurons in the input layer, and configuring the two or more output layers to include a variable number of neurons across the two or more output layers based at least in part on a type of output associated with each of the two or more output layers.

20. The apparatus of claim 15, wherein performing one or more automated actions comprises automatically training at least a portion of the one or more machine learning techniques using feedback related to one or more of the at least a portion of the one or more predicted failures and the at least a portion of the one or more predicted reasons.

* * * * *